May 10, 1927.

H. F. HOEVEL 1,628,317

CARRIAGE ARRANGEMENT FOR SAND BLAST APPARATUS

Filed Dec. 24, 1921　　2 Sheets-Sheet 1

INVENTOR
Herman F. Hoevel
BY
Lotka, Kellenbach & Mathé
ATTORNEYS

May 10, 1927.                                                                      1,628,317
                               H. F. HOEVEL
               CARRIAGE ARRANGEMENT FOR SAND BLAST APPARATUS
                         Filed Dec. 24, 1921              2 Sheets-Sheet 2

INVENTOR
Herman F. Hoevel
BY
Lotka, Kehlenbeck & Mathé
ATTORNEYS

Patented May 10, 1927.

1,628,317

UNITED STATES PATENT OFFICE.

HERMAN F. HOEVEL, OF NEW YORK, N. Y.

CARRIAGE ARRANGEMENT FOR SAND-BLAST APPARATUS.

Application filed December 24, 1921. Serial No. 524,626.

This invention relates to apparatus for sandblasting or otherwise spraying large objects such as lathe beds, cylinders, automobile bodies and the like, and it is the object of this invention to devise apparatus of this kind which can be operated with a high degree of efficiency, while at the same time protecting the operator against the injurious effects of sand and dust.

To accomplish this result, it has been tried to place the operator outside the chamber or house in which the cleaning was done, and to have him operate the nozzle through slots or openings in the wall of the chamber. This greatly reduced his freedom of action, making it difficult or impossible for him to clean parts of irregular shape. It has also been attempted to place the operator in a cage or carriage which could be pushed by an attendant toward or from the work to be treated, and in which the workman directing the nozzle would be protected against dust and sand. This arrangement had the drawback that the carriage had to be moved by the operator or by a second attendant, thus causing considerable loss of time.

According to the forms of my invention shown herein, I provide a cage or carriage which is run in or out of the cleaning house, that is, toward and from the work to be treated, automatically, as the work moves during operation, so that the operator is always at approximately the same distance from the particular surface to be cleaned or treated, but it will be understood that I do not restrict myself to these special arrangements.

The objects and advantages of my present invention will appear fully from the description following hereinafter and the novelty will be pointed out in the appended claims.

In the accompanying drawings I have illustrated preferred and satisfactory examples of my invention. In these drawings, Fig. 1 is a vertical section through an apparatus embodying one form of my invention, said section being taken substantially on line 1—1 of Fig. 2;

Figure 1:
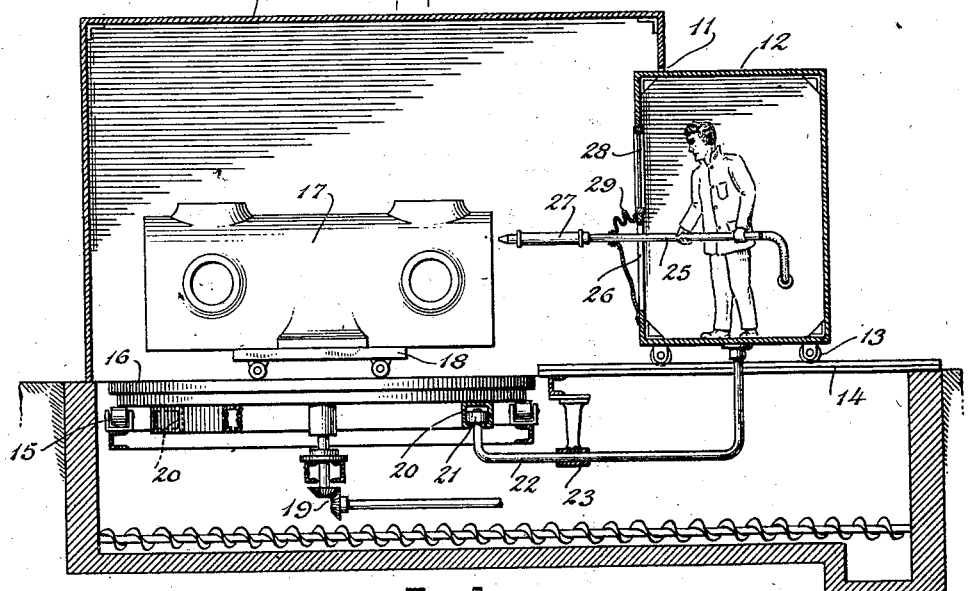
Figure 2:
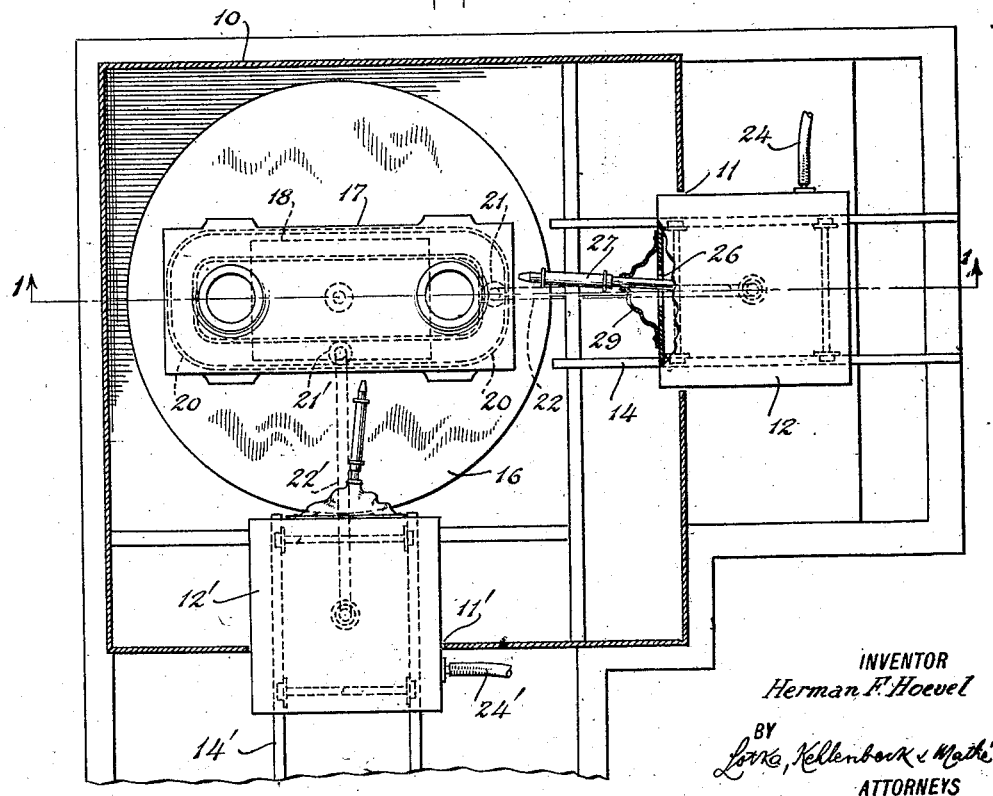
Fig. 2 is a plan view of the apparatus shown in Fig. 1, with parts in section.

Referring now first to the form of my invention illustrated by Figs. 1 and 2, 10 represents a chamber or housing having on one side an opening 11 normally closed by a cage or carriage 12 movable in a preferably straight in-and-out direction on wheels 13 travelling on a track 14. Inside the chamber 10 is arranged for rotation on rollers 15, a turntable 16 serving as a support for a casting or other object 17 to be treated, which latter may, for convenience in handling, be mounted on a truck 18. The turntable 16 may be rotated in any suitable manner, for instance by bevel gearing 19 driven from a motor or other source of power (not shown).

To the lower surface of the turntable 16 is secured a cam track 20 which conforms substantially to the outline of the article to be treated (see Fig. 2). In this cam track, at its point nearest to the carriage 12, is located a roller 21 journalled at one end of a rod 22 the other end of which is secured rigidly to the bottom of the carriage 12. The rod 22 may be guided in its movement parallel to the track 14, by a stationary guide 23.

Into the carriage 12 leads a flexible sandblast conduit 24 with which is connected, inside of the carriage, a pipe 25 having preferably a flexible portion and projecting to the outside of the carriage through a suitable opening or slot 26 in the wall of the carriage facing the inside of the chamber 10. At its free end the pipe 25 is provided with a nozzle 27 which may be held in operative position to the work to be treated, by an operator standing within the carriage 12. The flexible pipe portion within the carriage 12 allows the operator a certain amount of freedom in swinging the nozzle 27 with respect to the work on the turntable, while the flexible connection 24 permits of a reciprocating movement of the carriage. The operator may watch the operation of the device through a window 28, and the slot or opening 26 may be covered by a rubber curtain 29, as an additional protection of the operator against sand and dust.

In order to increase the efficiency of the apparatus, it may be desirable to arrange, in conjunction with one and the same chamber 10, a second nozzle carriage 12', such an arrangement being illustrated in Fig. 2. According to this view there is another track 14' extending at right angles to the first, and on this track travels the carriage 12' of the same construction as the first carriage. This second carriage is, of course, shown in its innermost position, since the corresponding roller 21' is now in its position nearest to the axis of the turntable 16. Both rollers 21 and 21' are in engagement with the same operating cam track 20.

The operation of the device illustrated by Figs. 1 and 2 will be understood readily: As the turntable 16 rotates, the surfaces of the casting 17 change their position with respect to a certain wall of the chamber 10. As has been described above, the cam track 20 follows substantially the contour of the casting 17, and owing to the engagement of the rollers 21 and 21' with this cam track, the rods 22 and 22' will be given a reciprocating movement, causing the carriages 12 and 12' to move in and out in a direction toward and from the axis of the turntable. It will be evident that when the particular surface of the casting 17 which is farthest away from the center of the turntable, reaches a position facing the carriage 12 or 12' the said carriage will be in its outermost position, that is, farthest away from the center of the turntable (see Fig. 1); and similarly when the surface or surface part of the casting 17 which is nearest to the center of the turntable, reaches a position facing the carriage, the carriage will be in its innermost position (see the lower part of Fig. 2).

Figure 3:
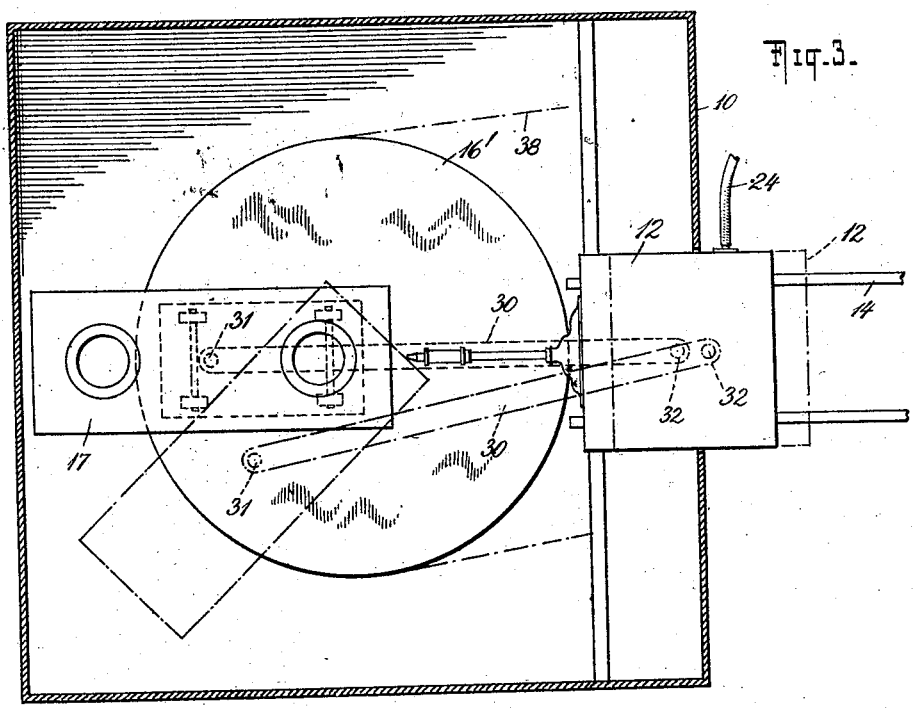
Fig. 3 is a plan view of an apparatus embodying another form of my invention.

In Fig. 3 I have shown a form of my invention in which the operative connection between the turntable 16' and the carriage 12 consists of a connecting rod 30 one end of which is secured to the turntable eccentrically by means of a crank pin 31, the other end being secured pivotally to the bottom of the carriage, as at 32. It will be seen that as the turntable rotates with the work to be treated, the carriage 12 will be moved in or out of the housing or chamber 10, that is, nearer to or farther away from the center of the turntable. To insure that in both extreme positions of the carriage the distance between the nozzle and the particular surface of the work facing the carriage will be the same, the work is preferably placed on the turntable in such a way that its center is in vertical alignment with the crank pin 31, as shown in Fig. 3.

Figure 4:
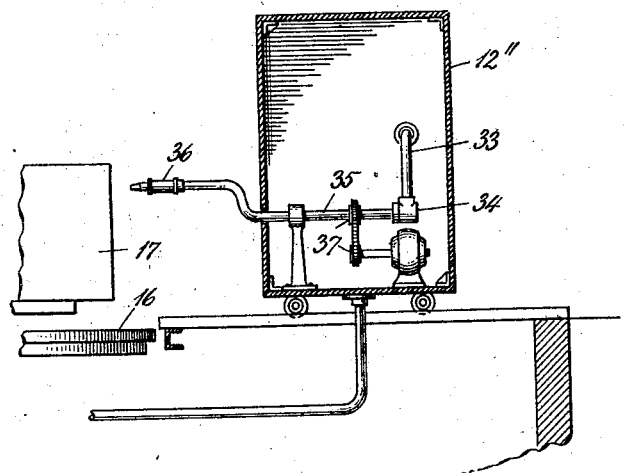
Fig. 4 illustrates a device for operating the nozzle automatically instead of by hand as shown in Fig. 1.

In Fig. 4 I have illustrated a carriage 12'' in which the nozzle is operated automatically, instead of by hand. With the pipe 33 leading into the carriage is connected, by means of a swivel joint 34, another pipe 35 projecting through the wall of the carriage. This pipe 35 has outside of the carriage an offset portion provided with a spraying nozzle 36, and it is rotated inside the carriage by means of gearing 37 driven in any suitable way, for instance by means of an electric motor mounted in the carriage.

By having an operative connection between the turntable or work support and the nozzle carriage, I am enabled to cause the distance between said carriage and said support to vary as different portions of the contour of the work are presented to the carriage, as may be required by the shape of the work, even if the work or article to be treated is of a very irregular outline. The positive action obtained by my invention insures an accurate relative positioning of the work and the carriage.

The turntable drive shown in Fig. 1 is not applicable to the construction shown in Fig. 3, since the latter requires a clearance under the center of the turntable for the unobstructed movement of the connecting rod 30. In the case of Fig. 3, the turntable might be driven, for instance, by a rope 38 applied to its periphery.

I claim as my invention:

1. In apparatus of the character described, a rotary support for the work to be treated, a nozzle-carriage movable toward and from said support, and a connecting rod one end of which is connected eccentrically with said support, the other end being connected with said carriage to cause movement of the carriage toward and from the support to occur simultaneously with the rotation of the support in such a way that the carriage is always approximately at the same distance from the surface of the work to be treated.

2. In apparatus of the character described, a housing provided with an opening, and a nozzle-carrier having an operator's stand, said carrier, with the operator and the nozzle, being movable in said opening and closing the same at all stages within the normal range of such movement.

3. In apparatus of the character described, a turntable, two nozzle-carriages movable toward and from said turntable in different directions, and mechanism for causing such movement of the carriages to occur simultaneously with the rotation of the turntable.

4. In apparatus of the character described, a turntable, a housing containing said turntable and provided with an opening, a nozzle carrier movable in said opening toward and from the said turntable, and mechanism for causing movement of the nozzle carrier to occur simultaneously with the rotation of the turntable.

In testimony whereof I have signed this specification.

HERMAN F. HOEVEL.